United States Patent [19]

Rawlings

[11] Patent Number: 4,516,924

[45] Date of Patent: May 14, 1985

[54] RETAINING MEANS FOR DEVICE FOR CENTRIFUGALLY CASTING SYMMETRICAL OR ASYMMETRICAL ARTICLES

[75] Inventor: David L. Rawlings, Bayville, N.Y.

[73] Assignee: International Hydron Corporation, New York, N.Y.

[21] Appl. No.: 491,159

[22] Filed: May 4, 1983

[51] Int. Cl.³ .......................... B29C 5/04; B29J 1/00
[52] U.S. Cl. ........................... 425/434; 65/302; 264/1.1; 264/2.1; 264/297.8; 264/311; 425/808
[58] Field of Search ............... 264/310, 311, 2.1, 1.1, 264/297; 65/71, 302; 425/808, 21, 434; 432/125; 221/310

[56] References Cited

U.S. PATENT DOCUMENTS

| | | | |
|---|---|---|---|
| 1,131,255 | 3/1915 | Luellen | 221/310 |
| 1,138,758 | 4/1915 | Hussey | 221/310 |
| 1,201,963 | 10/1916 | Hill | 221/310 |
| 1,256,913 | 2/1918 | Luellen | 221/310 |
| 3,107,141 | 10/1963 | Crafton . | |
| 3,660,545 | 4/1972 | Wichterle | 264/104 |
| 3,790,336 | 2/1974 | Brede | 432/125 |
| 4,228,918 | 10/1980 | Kellogg | 221/310 |

FOREIGN PATENT DOCUMENTS

| | | | |
|---|---|---|---|
| 911944 | 10/1972 | Canada | 221/310 |
| 965058 | 3/1975 | Canada | 221/310 |
| 159359 | 4/1974 | Czechoslovakia . | |
| 151998 | 11/1914 | United Kingdom | 221/310 |
| 337583 | 11/1930 | United Kingdom | 221/310 |
| 502624 | 3/1939 | United Kingdom | 221/310 |

Primary Examiner—Jay H. Woo
Assistant Examiner—Mike McGurk
Attorney, Agent, or Firm—Vincent P. Pirri

[57] ABSTRACT

A device for the centrifugal casting of articles in a rotatable polymerization column which includes retaining means disposed in the lower end of the column for communicating with a mold therein whereby the rotational speed of said mold and other vertically arranged molds above it are made substantially synchronous with the rotational speed of the column.

11 Claims, 9 Drawing Figures

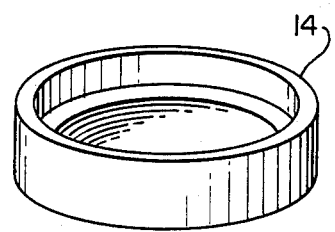
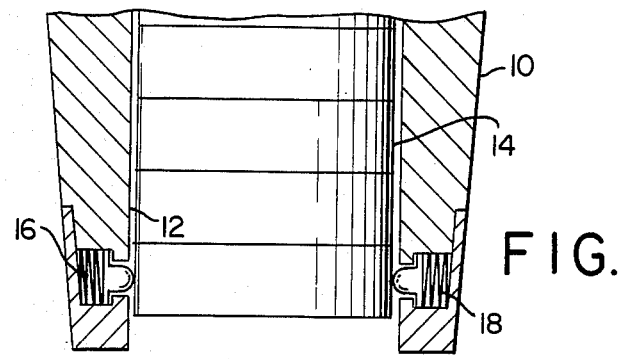
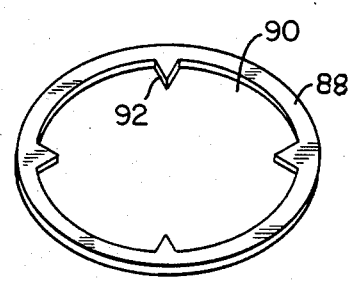
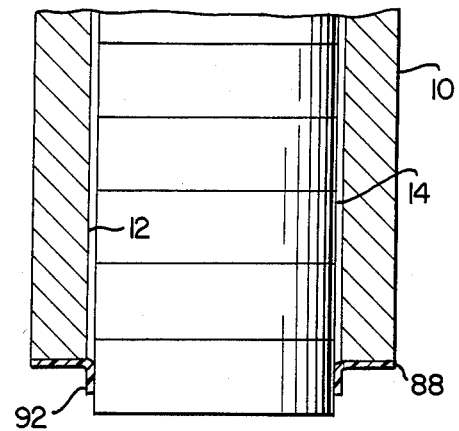

RETAINING MEANS FOR DEVICE FOR CENTRIFUGALLY CASTING SYMMETRICAL OR ASYMMETRICAL ARTICLES

DESCRIPTION

1. Technical Field

The present invention relates to a retaining means for a device for centrifugally casting a plurality of axially symmetrical or asymmetrical objects such as lenses, disc valves, and the like on a continuous basis. In a specific aspect, the present invention relates to a novel retaining means for a centrifugal casting device which employs a polymerization column and mold arrangement in which the tube is adapted to accommodate a number of vertically arranged molds.

2. Background Art

At present, centrifugal casting, such as polymerization-casting of axially symmetrical objects, such as e.g., lenses, artificial heart valve substitutes, etc., can be performed by various techniques.

One such technique utilizes equipment having individually rotating molds which contain the polymerization reactants and which are adapted to be rotated around their vertical axis. Rotation of each mold at a specifically determined speed creates a centrifugal force which causes the liquid reactants in the mold to generally assume a desired shape in the cavity of the mold that is contacted by the reactant composition. The molds can be grouped in linear array or alternatively can be assembled in carousel arrangement and individually rotated. This technique of operation along with various compositions that can be used in the spin casting of various objects are disclosed in U.S. Pat. No. 3,660,545 issued on May 2, 1972. This reference is incorporated herein by reference.

In another technique a rotatable polymerization tube is used which is adapted to receive a plurality of molds seated tightly to one another and each containing polymerization reactants. The molds are gravity fed into the upper end of the polymerization tube or column and free fall through the tube. The exit end of the tube is seated tightly on a revolving member which imparts rotation to the tube. In order to remove the lowermost mold from the column, the column is raised at least to the height of the mold and the lowermost mold is removed. The column is thereafter restored to its original position, i.e., seated tightly on the revolving member. Unfortunately, this type of apparatus causes operating problems because of the requirement that the polymerization column be raised in order to expose the last mold for removal. When the column is raised, the result is that there is a reduction of rotation which can cause defects in the desired product.

Thus, in the above described rotatable polymerization column and free falling mold arrangement, the inability to maintain the rotation of the molds during removal of the last mold causes the production of articles such as lenses which can fail to meet the desired specifications required for the lenses.

It is therefore an object of the present invention to provide a retaining means for a device for centrifugally casting quality reproducible symmetrical or asymmetrical articles, such as lenses, on a continuous basis.

Another object of the present invention is to provide a centrifugal casting device employing a polymerization column or tube which is adapted to accommodate a number of vertically arranged molds in sliding relationship with the column and which is provided with retaining means for retaining or communicating with a lower mold in the column whereby the rotational speed of said retained mold and other vertically arranged molds above it are made substantially synchronous with the rotational speed of the column.

The foregoing and additional objects will become fully apparent from the following description and the accompanying drawing.

DISCLOSURE OF THE INVENTION

The invention relates to a device for centrifugally casting of articles comprising a rotatable polymerization column adapted for rotation about a vertical axis and adapted for receiving in vertical series a plurality of molds containing a polymerizable or curable composition, said column having an inlet for receiving said molds and an outlet for discharging said molds, means for rotating said column at a desired rate of speed, and retaining means communicating with a lower mold in the column, said retaining means adapted to impart to said lower mold and to the other vertically arranged molds above it substantial synchronous rotation of these molds with the column.

In the practice of a preferred embodiment, the device is equipped with means for directing an inert gaseous medium through the column while it is rotating the molds. It is preferred that the gaseous medium be an inert gas of argon or nitrogen in the spin casting of soft contact lenses. This is due to the fact that undesirable air entrained within the tube during polymerization will inhibit the polymerization process and could result in a product of unacceptable quality. A feed of inert gas, such as nitrogen through the column will purge any entrained air and provide an inert environment for the polymerization process to occur.

The retaining means can be positioned at the lower portion of the column and can be a disc having a central core with inwardly protruding resilient members which can accommodate in retaining relationship a lower positioned mold in the column. Alternatively, the retaining means can be an arrangement of roller members which are positioned in the lower portion of the column and which are yieldable in a manner such as to accommodate a lower positioned mold as will be explained hereafter.

By the practice of the invention contemplated herein, there can be produced precision articles of predetermined and exacting details and dimensions e.g., small medical devices such as heart valves and diaphragms; contact lenses, and the like. Such articles, depending on the ultimate use, can be hard, flexible, or soft and can by hydrophilic or hydrophobic. In particular, the device with the retaining means can be utilized in the manufacture of a wide variety of contact lenses which can be symmetrical or asymmetrical and further characterized as hard, flexible or soft, water-absorptive or nonwater-absorptive.

The liquid lens-forming mixture can comprise monomer, prepolymer or prepolymer components. Particularly suitable components are hydrophilic monomers which preferably form slightly or moderately cross-linked, three dimensional networks such as those disclosed in U.S. Pat. No. 3,822,089. Illustrative hydrophilic monomers include water soluble monoesters of an acrylic acid or methacrylic acid with an alcohol having an esterifiable hydroxyl group and at least one additional hydroxyl group such as the mono- and polyaklylene glycol monoesters of methacrylic acid and acrylic acid, e.g., ethylene glycol monomethacrylate, ethylene glycol monoacrylate, diethylene glycol monomethacrylate, diethylene glycol monoacrylate, propylene glycol monomethylate, dipropylene glycol monoacrylate, and the like; the N-alkyl and N,N-dialkyl substituted acrylamides and methacrylamides such as N-methylacrylamide, N,N-dimethylmethacrylamide, and the like; N-vinylpyrrolidone; the alkyl substituted N-vinyl pyrrolidones, e.g., methyl-substituted N-vinylpyrrolidone; glycidyl methacrylate; glycidyl acrylate; mixtures thereof; and others known to the art. Also useful are the alkyl ether acrylates and methacrylates and the vulcanizable silicone fluids or elastomers. The alkyl moieties which are especially suitable in the aforementioned compounds are those which contain from 1 to 5 carbon atoms therein.

Hydrophobic monomers particularly useful in the practice of the invention to manufacture contact lenses include hydrophobic acrylic esters, suitable lower alkyl acrylic esters, preferably wherein the alkyl moiety contains 1–5 carbon atoms, such as methyl acrylate or methacrylate, ethyl acrylate or methacrylate, N-propyl acrylate or methacrylate, isopropyl acrylate or methacrylate, isobutyl acrylate or methacrylate, N-butyl acrylate or methacrylate, or mixtures thereof.

Preferred monomeric mixtures contain at least one alkylene glycol monoester of methacrylic acid, especially ethylene glycol monomethacrylate, and at least one crosslinking monomer such as the alkylene glycol diester or methacrylic acid, especially ethylene glycol dimethacrylate. Such mixtures may contain other polymerizable monomers, desirable in minor amounts such as N-vinylpyrrolidone, methyl methacrylate, acrylamide, N-methylacrylamide, diethylene glycol monomethacrylate, and others illustrated above.

The above illustrated monomers, monomeric mixtures including mixtures of hydrophobic and hydrophilic reactants, may be further admixed with a minor proportion of di- or polyfunctional polymerizable species to cause crosslinking of the polymeric matrix as polymerization or curing proceeds. Examples of such di- or polyfunctional species include: divinylbenzene, ethylene glycol diacrylate or dimethacrylate, propylene glycol diacrylate or dimethacrylate, and the acrylate or methacrylate polyesters of the following polyols: triethanolamine, glycerol, pentaerythritol, butylene glycol, diethylene glycol, triethylene glycol, tetraethylene glycol, mannitol, sorbitol and the like. Other crosslinking monomers can be illustrated by N,N-methylene-bis-acrylamide or methacrylamide, sulfonated divinylbenzene, and divinylsulfone.

The polymerization reaction can be carried out in bulk or with an inert solvent. Suitable solvents include water; organic solvents such as water-soluble lower aliphatic monohydric alcohols as well as polyhydric alcohols, e.g., glycol, glycerol, dioxane, etc. and mixtures thereof. In general, the solvent, if employed, can comprise a minor proportion of the reaction medium, i.e., less than about 50 weight percent.

Polymerization of monomer mixtures may be carried out with free radical catalysts of the type in common use in vinyl polymerization. Such catalyst species include organic peroxides, the alkyl percarbonates, hydrogen peroxides, and inorganic materials such as ammonium, sodium, or potassium persulfate. Polymerization using such catalysts may occur at temperatures between ambient temperature, e.g., about 20° C. and about 100° C., depending on the speed of polymerization desired.

Polymerization may also occur between monomer or prepolymer mixtures under the influence of elevated temperatures and/or radiation (U.V., x-ray, or other well-known forms of radioactivity) with/without well-known initiator(s).

Patents which further illustrate lensforming materials useful in the preparation of contact lenses include, by way of examples, U.S. Pat. Nos. Re 27,401; 3,639,524; 3,699,089; 3,700,761; 3,822,089; 4,121,896; 4,208,365; and 4,223,984; the full disclosures of which are incorprated by reference as if set out in full text.

BRIEF DESCRIPTION OF DRAWINGS

The present invention will become more apparent from the following description thereof when considered together with the accompanying drawing which is set forth as being exemplary of embodiments of the present invention and is not intended in any way to be limited thereof and wherein:

FIG. 2 is a perspective view of a mold for use in the polymerization column.

FIG. 3 is an enlarged view of the lower portion of the column shown in FIG. 1.

FIG. 4 is a view similar to FIG. 3 but showing a different arrangement i.e., a disc for retaining a mold in the lower portion of the column.

FIG. 5 is a plan view of the disc for retaining the mold shown in FIG. 4.

DETAILED DESCRIPTION OF THE DRAWINGS

Figure 1:
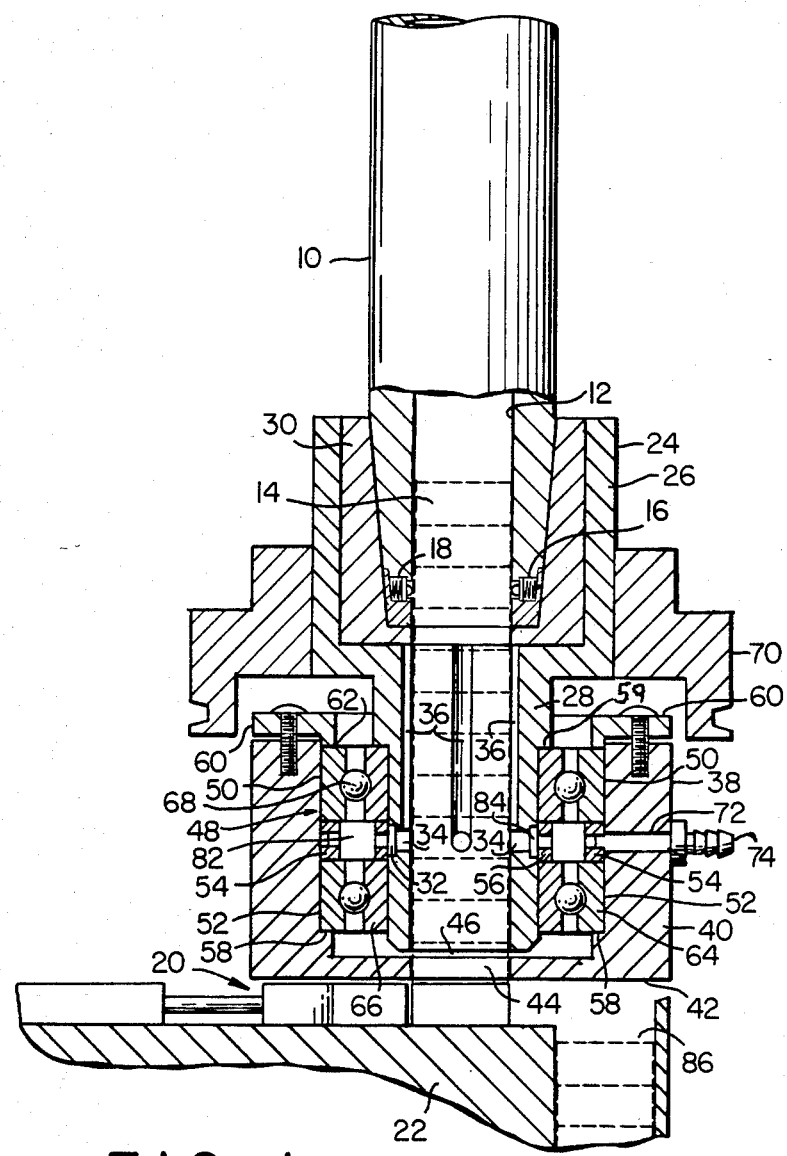
FIG. 1 is a side elevational view partly in cross-section of the present invention showing one embodiment of a novel retaining means at the lower portion of a polymerization column, and also showing a preferred gas feeding system associated with the column.

Referring in detail to FIG. 1 there is shown a portion of a polymerization column 10 which can be employed for practice of the invention. It will be seen that the column 10 has an internal wall 12 and a series of vertically arranged molds 14 having a configuration as shown in FIG. 2. The column 10 can be equipped for heating or cooling by means of a cooling and/or heating jacket (now shown) and with conventional drive means for rotation of the column. The molds 14 are vertically arranged in the column and can be fed to the column by any suitable means such as by means of a hopper disposed over the column whereby molds are disposed in vertical array and released one at a time into the column utilizing a stop lever mechanism (not shown). The lower portion of column 10 is provided with retaining means for communicating with a lowermost mold in the column. The retaining means are either integrally or detachably secured to the column so that when they communicate with a mold, the mold is rotated synchronous with the column and the other vertically disposed molds are likewise rotated due to the frictional contact between superposed molds. The retaining means can be an arrangement of compressible members 16 circumferentially disposed on the inner surface of column 10 in a manner such that when pressure is directed against the appropriate lower mold, the mold preferably urges the compressible member inwardly and the mold is then seated with its lower surface resting on one or more molds which have been released from the column.

As shown in FIG. 3, the compressible members 16 are projections which in normal position extent beyond the inner wall 12 in the direction of the central longitudinal axis of column 10. The compressible members 16 can be urged away from its normal position and inward toward the inner wall of column 10 to permit passage of a mold by pressure exerted against an urging means such as a spring 18 which is either fixedly or detachably secured to column 10.

The retained mold i.e., the mold communicating with compressible members 16 is then brought into substantially synchronous rotation with column 10. Since the vertically superposed molds are in frictional contact with the retained mold, they in turn would be subject to the rotational influence of the column and the retained mold.

There are at least two spaced compressible members preferably three to six and most preferably four equally spaced members which can be disposed circumferentially around column 10. The material of fabrication of the compressible members 16 should be sufficiently hard to withstand the frictional contact made with the outer walls of the molds without exhibiting excessive friction against the molds 14. Moreover, the extent of compression should be such that the compressible members will permit passage of the mold through the column under the influence of appropriate pressure.

The retained mold is supported by the molds below it in the column as shown in FIG. 1. When the lower-most mold on base 20 is ejected by pusher element 20 the remaining molds in the column will descend a distance equal to the thickness of one mold upon the return of pusher element 20 to its normal position.

Various types of gas feed means can be employed in the present invention.

Referring again to FIG. 1 there is shown a gas feed means of the type disclosed in the copending application of David Rawlings filed on May 3, 1983, Ser. No. 490,626 now U.S. Pat. No. 4,468,184 and which is particularly suitable and preferred for use in this invention. Specifically and as shown in FIGS. 1 to 3, the gas feed means includes a rotatable sleeve member 24 having an upper tubular section 26 and a lower tubular section 28. As will be seen, the upper tubular section 26 has a larger cross-sectional area than polymerization column 10 and lower tubular section 28. Disposed within the upper tubular section 26 is a resilient liner material 30, preferably fabricated from plastic that is slightly tapered and adapted for receiving the lower end of polymerization column 10 in frictional securement therein. As shown, the lower end of polymerization column 10 is slightly tapered to permit easy insertion and securement of polymerization column 10 within liner 30. Although liner 30 is preferably made of plastic, it can be made of any resilient material that would be suitable for securing the lower end of the polymerization column 10 in frictional securement within said liner 30 so that rotation of rotatable sleeve member 24 will impart synchronized rotation to polymerization column 10. As shown in FIG. 1, the inner diameter of polymerization column 10 is substantially equal to the inner diameter of lower tubular section 28 of sleeve member 24 and axially aligned therewith so that molds 14 exiting from polymerization column 10 will be fed into and descend through lower tubular section 28 of sleeve member 24.

Figure 6:
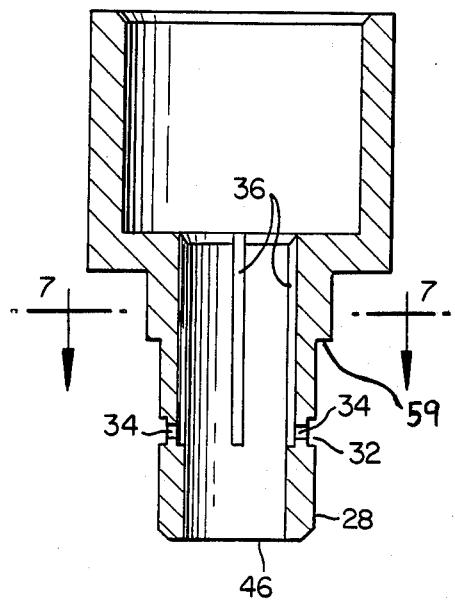
FIG. 6 is a side elevational view in cross-section of the rotatable sleeve member 24 of the preferred gas feed system shown in FIG. 1.
Figure 7:
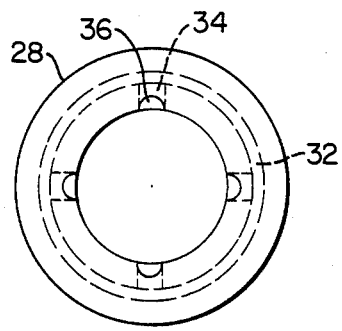
FIG. 7 is a view taken along the lines 7—7 of FIG. 6.

As shown in FIGS. 1, 6 and 7, a circumferential groove 32 is formed in the outer wall surface of lower tubular section 28 and a plurality of gas inlet openings 34 are circumferentially disposed through and defined by the base of groove 32. A plurality of longitudinal grooves 36 are formed in the inner wall of lower tubular section 28 with each groove 36 extending from a communicating gas inlet opening 34 up through the top of lower tubular section 28. Thus any gas entering inlet openings 34 when molds 14 are disposed within lower tubular section 28 will be directed up through grooves 36 and into the interior of polymerization column 10.

Referring to FIG. 1, lower tubular section 28 of sleeve member 24 is disposed within a cylindrical cupped support member 38 having an upstanding cylindrical wall 40 and a base 42 defining an opening 44 which is axially aligned with the opening 46 of lower tubular section 28. Disposed between the upstanding cylindrical wall 40 and lower tubular section 28 is a cylindrical preloaded bearing pair 48 including an upper bearing 50 and a lower bearing 52. Separating the bearing pair 48 and supporting upper bearing 50 is an outer support ring 54 disposed adjacent cylindrical wall 40 and an inner support ring 56 disposed adjacent the outer wall of lower tubular section 28. In assembling the unit the lower bearing 52 is placed into cylindrical cupped support member 38 such that its lower surface rests on flange 58. Outer support ring 54 and inner support ring 56 are then positioned on top of lower bearing 52 and upper bearing 50 can then be mounted on top of outer support ring 54 and inner support ring 56. When rotatable sleeve member 24 is inserted within support member 38, circular flange 59 disposed on the outer wall of lower tubular section 28 secures upper bearing 50 in place. A securing ring 60 having an L-shaped crosssection is detachably secured to the top of support member 38 by any suitable means such as the threaded elements shown, with its internal flange member 62 securing the upper bearing 50 in proper alignment within support member 38. Each of the bearings 50, 52 includes an outer fixed race 64 and an inner rotatable race 66 which are spaced apart by conventional ball bearings 68. By this arrangement, member sleeve 24 can be rotated within support member 38 by conventional fly wheel means illustrated generally as 70 operatively associated with a conventional motor driven belt means not shown.

Figure 8:
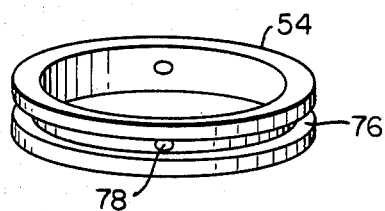
FIG. 8 is a perspective view of the outer support ring member for the bearing pair of the gas feed system shown in FIG. 1.
Figure 9:
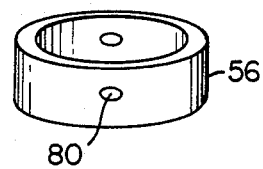
FIG. 9 is a perspective view of the inner support ring member for the bearing pair shown in the gas feed system of FIG. 1.

Support member 38 is provided with an opening 72 defined in its side wall into which is secured a hose barb 74 which is adapted to be connected to a gaseous supply means not shown. As shown in FIG. 8 outer support ring 54 is provided with annular groove 76 disposed in its outer wall. A plurality of openings 78 is circumferentially disposed in the base of groove 76 and extends from the base of the groove through the inner wall of 54. As shown in FIG. 9, inner support ring 56 defines a plurality of openings 80 extending through its upstanding wall. Referring again to FIG. 1, it will be seen that the spaced apart preloaded bearing pair 48 and the spaced apart outer support ring 54 and inner support ring 56 define an annular zone 82.

In the operation mode and with reference to the drawing, a gaseous medium fed through opening 72 travels along and within annular groove 76 and is directed through openings 78 and into annular zone 82. The gaseous medium is then directed through openings 80 in inner support ring 56, into and through openings 34 of lower tubular section 28 and up longitudinal grooves 36 into the interior of polymerization column 10. The height of inner support ring 56 is greater than the width of circumferential groove 32 in lower tubular section 28 so that when inner support ring 56 is positioned adjacent groove 32, a circumferential zone 84 is defined that can accommodate a gaseous medium fed through openings 80 of inner support ring 56. This will allow a uniform gas flow to be fed through gas inlet openings 34 and up through grooves 36 into polymerization column 10. In the operational mode, molds 14 ejected from the polymerization column 10, into tubular section 28 will effectively prevent any gaseous medium fed through openings 34 from escaping out opening 46 of tubular section 28. Thus the gaseous inert medium will flow up through grooves 36 into the interior of polymerization column 10 where it will purge any entrained, undesirable gas such as oxygen in polymerization column 10 which could effect the quality and acceptability of the articles being casted. As shown in FIG. 1, an ejected mold 14 ejected through opening 44 of the gas feed means will be supported on base 22 whereupon a conventional pusher means including element 20 will advance the ejected mold to a receptacle 86.

The preloading bearing pair 48 desirably incorporate seals of a conventional type which would provide a retention of lubricants for the bearings. These seals would serve to define the circumferential zone 82 and effectively prevent the escape of any gas to areas other than through the plurality of openings 34 in tubular section 28 of sleeve member 24.

In an alternate embodiment and with reference to FIGS. 4 and 5, the retaining means is shown as a disc member 88. The disc member 88 is positioned within the lower portion of column 10 so that the horizontal axis is substantially perpendicular to the vertical axis of column 10. The disc member 88 can be fabricated from resilient material such as plastic and is of a thickness such that it will withstand permanent deformation under conditions of use. The central portion of disc 88 defines a central opening 90 which is of a diameter sufficient to allow passage of the mold 14 when resilient protrusions 92 are urged inwardly upon accommodation of mold 14.

The resilient protrusions extend interiorly towards the center of the disc and are spaced along the inner circumference of the disc defining central core or opening 90. The outer periphery of disc member 88 can be either rigidly or, alternatively, detachably secured to the inner periphery of column 10. Additionally, the disc can be adhered to the lower end of the column by adhesive means or can have a vertical lip for force fitting around the column.

There is at least one resilient protrusion and preferably 2 to 8 resilient protrusions, most preferably there are 4 to 6 resilient protrusions circumferentially spaced along the inner periphery of the disc. The protrusions are preferably triangular shaped as shown in the drawing.

In a manner of operation similar to the alternatively described retaining means, a mold free falls into the central core or opening 90 of disc member 88 such that the outer mold wall communicates with protrusions 92 during rotation of column 10. The protrusions should be resilient and capable of "bending" to accommodate the outer surface of the mold and should frictionally contact the mold surface so that rotation of the disc will rotate the mold.

The rotating disc imparts further rotational motion to the retained mold due to frictional contact with resilient protrusions 92 and the superposed molds in the column are also rotated due in part to the frictional contact with the mold held by the rotating disc.

Utilizing the gas delivery means specifically described herein, it will be obvious that the belt means which is connected to a conventional motor means (not shown) will rotate column 10 at the designated rate of speed.

The device can have other types of conventional gas feeding means for directing an inert gaseous medium through the rotating polymerization tube containing the rotating molds. It is preferred that in the spin casting of soft contact lenses, the gaseous medium can be an inert gas of argon or nitrogen. This is due to the fact that undesirable air entrained within the tube during polymerization will inhibit the polymerization process and thereby result in a product of unacceptable quality. A feed of inert gas, such as nitrogen, through the polymerization tube will purge any entrained air and provide an inert environment for the polymerzation process to occur.

It should be understood, of course, that the foregoing disclosure relates only to preferred embodiments of the invention. It is pointed out also that the word "column" in this specification is used in a generic sense and whose external as well as its hollow internal cross-sectional areas can represent, by way of illustrations, a circle, triangle, square, and the like. It is not necessary that the cross-sectional shapes of the column and of the mold be the same. For example, the hollow cross sectional shape of the column can represent a square and the horizontal cross sectional area of the mold can represent a circle provided, in this illustration, that the external diameter of the mold is slightly smaller than the length of one side of the square.

What is claimed is:

1. A device for the centrifugal casting of contact lenses comprising a rotatable polymerization column adapted for receiving in vertical series and in free falling arrangement a plurality of molds containing a polymerizable or curable composition, said column having an inlet for receiving said molds and an outlet for discharging said molds, means for rotating said column at a desired rate of speed, gas means for introducing gas up said column and retaining means disposed in the lower end of said column for retaining a lower mold in said column for a desired length of time, said retaining means being adapted to hold said mold for synchronous rotation with said column and to impart said synchronous rotation to said other vertically arranged molds and to release said lower mold during rotation of said column under the influence of pressure directed from said other vertically arranged molds.

2. A device according to claim 1, wherein said retaining means include at least two compressible members circumferentially disposed on the inner surface of said column and which extend radially inwardly in said column.

3. A device according to claim 2, wherein said compressible members include urging means whereby said compressible members can be urged away from the inward portion of said column to permit holding of said mold and to permit passage of said mold.

4. A device according to claim 2, having three to six compressible members.

5. A device according to claim 2 having four compressible members.

6. A device according to claim 1 wherein said retaining means is a substantially circular disc member adapted to be fixedly positioned at the lower portion of said column in a manner such that the horizontal axis of said disc member is substantially perpendicular to the vertical axis of said column.

7. A device according to claim 6 wherein said disc member defines a central opening and in which resilient protrusions extend interiorly toward the center of said disc into said central opening.

8. A device according to claim 7 wherein said central opening of said disc is of a diameter sufficient to allow passage of said mold when said resilient protrusions are urged downwardly thereby releasing said mold.

9. A device according to claim 7 having from two to eight resilient protrusions.

10. A device according to claim 7 having from four to six resilient protrusions.

11. A device according to claim 7 wherein said resilient protrusions are triangular shaped.

* * * * *